US006506848B2

(12) United States Patent
Hoenig et al.

(10) Patent No.: US 6,506,848 B2
(45) Date of Patent: Jan. 14, 2003

(54) RHEOLOGY MODIFICATION OF ELASTOMERS

(75) Inventors: Wendy D. Hoenig, Lake Jackson, TX (US); Teresa Karjala, Lake Jackson, TX (US); Che-I Kao, Lake Jackson, TX (US); Clark H. Cummins, Midland, MI (US); Michael J. Mullins, Lake Jackson, TX (US); H. Craig Silvis, Midland, MI (US); Thoi H. Ho, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 10/021,134

(22) Filed: Oct. 29, 2001

(65) Prior Publication Data

US 2002/0123573 A1 Sep. 5, 2002

Related U.S. Application Data

(62) Division of application No. 09/129,161, filed on Aug. 5, 1998, now Pat. No. 6,376,623.
(60) Provisional application No. 60/057,582, filed on Aug. 27, 1997.

(51) Int. Cl.[7] .................................................. G08F 8/34
(52) U.S. Cl. .............................. 525/331.8; 525/332.7; 525/332.8; 525/333.9; 525/344; 525/351
(58) Field of Search ...................... 525/331.8, 332.7, 525/332.8, 333.9

(56) References Cited

U.S. PATENT DOCUMENTS

| | | | |
|---|---|---|---|
| 3,058,944 A | 10/1962 | Breslow et al. | |
| 3,203,936 A | 8/1965 | Breslow et al. | |
| 3,203,937 A | 8/1965 | Breslow et al. | |
| 3,282,864 A | 11/1966 | Best et al. | |
| 3,298,975 A | 1/1967 | Feild et al. | |
| 3,336,258 A | 8/1967 | Cox | |
| 3,341,480 A | 9/1967 | Feild et al. | |
| 3,389,198 A | 6/1968 | Taber | |
| 3,530,108 A | 9/1970 | Oppenlander et al. | |
| 4,352,892 A | 10/1982 | Lohmar | |
| 4,579,905 A | 4/1986 | Krabbenhoft | |
| 4,694,025 A | 9/1987 | Park | |
| 4,714,716 A | 12/1987 | Park | |
| 5,037,895 A | 8/1991 | Marker et al. | |

FOREIGN PATENT DOCUMENTS

| | | |
|---|---|---|
| CA | 797917 | 10/1968 |
| CA | 1024296 | 1/1978 |
| CA | 1219389 | 3/1987 |
| DE | 1 569 025 | 3/1964 |
| EP | 1080619 | 7/1966 |
| EP | 0 702 032 A2 | 3/1996 |
| GB | 2 205 103 A | 11/1988 |
| JP | 46-31756 | 9/1971 |
| JP | 50-133248 | 10/1975 |
| WO | 96/07681 | 3/1996 |

OTHER PUBLICATIONS

R. A. Abramovitch, "Polar Radicals in Aromatic Substitution", *Intra–Science Chemistry Reports*, pp. 211–218, (1969).
R. A. Abramovitch, G. N. Knaus, M. Pavlin, and W. D. Holcomb, "Reaction of Sulphonyl Azides with Unstrained Olefins", *J. Chem. Soc.*, pp. 2169–2172, (1974).
R. A. Aramovitch, T. Cheltathurai, W. D. Holcomb, I. T. McMaster. and D. P. Vanderpool. "Intramolecular Insertion of Arylsulfonylnitrenes into Aliphatic Side Chains", *J. Org. Chem.*, vol. 42, No. 17, pp. 2920–2926 (1977).
R. A. Abramovitch, S. B. Hendi, and A. O. Kress, "Pyrolysis of Phenylalkylsulphonyl Azides and 2–phenethyl Azidoformate, Selectivity of Sulphonylnitrenes and Contrast between Sulphonyl–and Carbonyl–nitrenes", *J. Chem. Soc. Chem. Commun.*, pp. 1087–1088 (1981).
R. A. Abramovitch, M. Ortiz, and S. P. McManus, "Reaction of Aromatic Sulfonyl Azides with Dienes", *J. Org. Chem.*, vol. 46, pp. 330–335 (1981).
H. Radusch, J. Ding, and M. Schultz, "Chemical coupling of polystyrene and polybutadiene in melt mixtures by using an organic sulfonylazide", *Die Angewandte Makromolekulare Chemie*, vol. 204, pp. 177–189, (1993).
N. Takashima, Y. Nakayama, "The Processings of Crosslinked Plastics", *Kogaku Kogyo (Chemical Industry)*, pp. 34(378)–39(383), (1969).
D. S. Breslow, M. F. Sloan, N. R. Newburg, and W. B. Renfrow, "Thermal Reactions of Sulfonyl Azides", *J. Amer. Chem. Soc.*, vol. 91, pp. 2273–2279, (1969).
J. L. de Benito González, I. Rueda, and L. González Hermádez, "The Use of 1, 3 bis Benzene Sulphonyl Azide as an Elastomer Crosslinking Agent", Kautsch. Gummi. Kunsist. vol. 43, pp. 697–700, (1990).
Derwent Chemical Abstract No. 77–02552Y of JP 51134762 A.
P. Mapleston, "PP foam sheet emerges as a contender for a range of applications", *Modern Plastics*, pp. 110–111, (1997).

*Primary Examiner*—Bernard Lipman
(74) *Attorney, Agent, or Firm*—Whyte Hirschboeck Dudek SC

(57) ABSTRACT

The present invention includes a process of preparing a coupled polymer comprising heating an admixture containing (1) at least one elastomer comprising ethylene and at least one comonomer which is selected from alpha olefins having at least 3 carbon atoms, dienes and combinations thereof and (2) a coupling amount at least one poly(sulfonyl azide) to at least the decomposition temperature of the poly(sulfonyl azide) for a period sufficient for decomposition of at least 80 weight percent of the poly(sulfonyl azide) and sufficient to result in a coupled polymer having a gel content of less than 2 weight percent. The invention includes compositions comprising the reaction product formed by the inventive process. The invention additionally includes articles which comprise a composition of the invention particularly when the article is formed from a melt of the composition.

9 Claims, No Drawings

RHEOLOGY MODIFICATION OF ELASTOMERS

CROSS-REFERENCE TO RELATED APPLICATIONS

This application is a division of U.S. patent application Ser. No. 09/129,161, filed Aug. 5, 1998, now U.S. Pat. No. 6,376,623.

This application claims the benefit of U.S. Provisional Application No. 60/057,582, filed Aug. 27, 1997 which is incorporated by reference herein in its entirety.

This invention relates to coupling of polyolefins, more specifically coupling of elastomeric polyolefins.

As used herein, the term "rheology modification" means change in melt viscosity of a polymer as determined by dynamic mechanical spectroscopy. Preferably the melt strength increases while maintaining the high shear viscosity (that is viscosity measured at a shear of 100 rad/sec by DMS) so that a polymer exhibits more resistance to stretching during elongation of molten polymer at low shear conditions (that is viscosity measured at a shear of 0.1 rad/sec by DMS) and does not sacrifice the output at high shear conditions. An increase in melt strength is typically observed when long chain branches or similar structures are introduced into a polymer. Rheology modification is particularly important when the polyolefins are elastomers.

The term "elastomer" was first defined in 1940 to mean synthetic thermosetting high polymers having properties similar to those of vulcanized natural rubber, e.g. having the ability to be stretched to at least twice their original length and to retract very rapidly to approximately their original length when released. The elastic recovery (that is recovery of original dimension) of an elastomer is generally at least 40 percent, preferably at least 60 percent, and more preferably at least 70 percent after the sample is elongated 100 percent of an original dimension at 20° C. according to the procedures of ASTM D 4649. Representative of these "high polymers" were styrene-butadiene copolymer, polychloroprene, nitrile butyl rubber and ethylene-propylene polymers (aka EP and EPDM elastomers). The term "elastomer" was later extended to include uncrosslinked thermoplastic polyolefin elastomers, that is, thermoplastic elastomers (TPEs).

ASTM D 1566 defines various physical properties of elastomers, and the test methods for measuring these properties.

A dilemma faced in the production of commercially viable cured elastomers is that a high weight average molecular weight is generally desired to improve physical properties such as tensile strength, toughness, and compression set, in the cured product, but the uncured high molecular weight elastomers are more difficult to process than their lower molecular weight counterparts. In particular, the higher molecular weight uncured elastomers are typically more difficult to isolate from solvents and residual monomer following polymerization of the elastomer. The uncured higher molecular weight elastomers are also typically more difficult to extrude at high rates, since they are generally prone to shear fracture at lower extrusion rates and require more power consumption by polymer processing equipment such as batch mixers, continuous mixers, extruders, etc., and cause increased wear on the parts of such equipment exposed to high shear stresses, such as expensive extruder components. These disadvantages reduce production rates and/or increase the cost of production.

Often, a relatively low molecular weight elastomer produced then is fully crosslinked in a final product to obtain the desired tensile strength, toughness, compression set, etc. The relatively lower molecular weights of elastomer are easiest to produce. Disadvantageously, however, a low molecular weight of an elastomer also in most instances, corresponds to a low "green strength" (i.e., strength prior to crosslinking). The disadvantage is particularly noticeable in applications such as coating wire and cable, continuous extrusion of gaskets, etc., where low green strength results in sags or uneven polymer thickness. Rheology modification of a lower molecular weight elastomer, however, is an advantageous manner to solve the problem.

Polyolefins are frequently rheology modified using non-selective chemistries involving free radicals generated for instance using peroxides or high energy radiation. However, chemistries involving free radical generation at elevated temperatures also degrade the molecular weight, especially in polymers containing tertiary hydrogen such as polystyrene, polypropylene, polyethylene copolymers etc. The reaction of polypropylene with peroxides and pentaerythritol triacrylate is reported by Wang et al., in Journal of Applied Polymer Science, Vol. 61, 1395–1404 (1996). They teach that branching of isotactic polypropylene can be realized by free radical grafting of di- and tri-vinyl compounds onto polypropylene. However, this approach does not work well in actual practice as the higher rate of chain scission tends to dominate the limited amount of chain coupling that takes place. This occurs because chain scission is an intra-molecular process following first order kinetics, while branching is an inter-molecular process with kinetics that are minimally second order. Chain scission results in lower molecular weight and higher melt flow rate than would be observed were the branching not accompanied by scission. Because scission is not uniform, molecular weight distribution increases as lower molecular weight polymer chains referred to in the art as "tails" are formed.

The teachings of U.S. Pat. Nos. 3,058,944; 3,336,268; and 3,530,108 include the reaction of certain poly(sulfonyl azide) compounds with isotactic polypropylene or other polyolefins by nitrene insertion into C—H bonds. The product reported in U.S. Pat. No. 3,058,944 is crosslinked. The product reported in U.S. Pat. No. 3,530,108 is foamed and cured with cycloalkane-di(sulfonyl azide) of a given formula. In U.S. Pat. No. 3,336,268 the resulting reaction products are referred to as "bridged polymers" because polymer chains are "bridged" with sulfonamide bridges. The disclosed process includes a mixing step such as milling or mixing of the sulfonylazide and polymer in solution or dispersion then a heating step where the temperature is sufficient to decompose the sulfonylazide (100° C. to 225° depending on the azide decomposition temperature). The starting polypropylene polymer for the claimed process has a molecular weight of at least about 275,000. Blends taught in U.S. Pat. No. 3,336,268 have up to about 25 percent ethylene propylene elastomer.

U.S. Pat. No. 3,631,182 taught the use of azido formate for crosslinking polyolefins. U.S. Pat. No. 3,341,418 taught the use of sulfonyl azide and azidoformate compounds to crosslink of thermoplastics material(PP (polypropylene), PS (polystyrene),PVC (poly(vinyl chloride)) and their blends with rubbers(polyisobutene, EPM, etc.).

Similarly, the teachings of Canadian patent 797,917 (family member of NL 6,503,188) include rheology modification using from about 0.001 to 0.075 weight percent polysulfonyl azide to modify homopolymer polyethylene and its blend with polyisobutylene.

In the case of elastomeric polymers containing ethylene repeating units in which the preferred comonomer content is about 5–25 mole percent, and preferably a density less than about 0.89 g/mL, it would be desirable to have a better mechanical properties such as elongation and tensile strength than would be achieved in the starting material or by coupling using the same chemical equivalents of free radical generating agent like a peroxide.

SUMMARY OF THE INVENTION

Polymers coupled by reaction with coupling agents according to the practice of the invention advantageously have at least one of these desirable properties and preferably have desirable combinations of these properties.

The present invention includes a process of preparing a coupled polymer comprising heating an admixture containing (1) at least one elastomer comprising ethylene and at least one comonomer which is selected from alpha olefins having at least 3 carbon atoms, dienes and combinations thereof and (2) a coupling amount at least one poly(sulfonyl azide) to at least the decomposition temperature of the poly(sulfonyl azide) for a period sufficient for decomposition of at least about 80 weight percent of the poly(sulfonyl azide) and sufficient to result in a coupled polymer having a gel content of less than about 2 weight percent. The elastomer preferably comprises ethylene, and alpha olefin of at least three carbon atoms and optionally at least one diene and preferably has a density of at least about 0.850 and up to about 0.90 g/mL. More preferably the elastomer is an ethylene/octene copolymer or an ethylene/propylene/norbornene copolymer. Preferably the polymer is prepared using a metallocene or constrained geometry catalyst and more preferably has a narrow molecular weight distribution. Optionally the process additionally comprises steps (b) fabricating an article from the coupled polymer and (c) crosslinking the fabricated coupled polymer.

The poly(sulfonyl azide) and elastomer preferably react at a temperature at least the decomposition temperature and greater than about 150° C.

The invention includes compositions comprising the reaction product formed by heating an admixture containing (1) at least one elastomer comprising ethylene and at least one comonomer which is selected from alpha olefins having at least 3 carbon atoms, dienes and combinations thereof and (2) a coupling amount at least one poly(sulfonyl azide) to at least the decomposition temperature of the poly(sulfonyl azide) for a period sufficient for decomposition of at least about 80 weight percent of the poly(sulfonyl azide) said reaction product having less than about 2 weight percent gel; which compositions preferably have coupling indicated by a viscosity change at a shear frequency of 0.1 rad/sec of greater than 5 percent as measured by DMS.

The invention additionally includes articles which comprise a composition of the invention particularly when the article is formed from a melt of the composition. The article is preferably a coating for wire or cable, a tube, a gasket, a seal, roofing, or fiber. Further the invention includes the use of the composition to form the articles and process of formation of the articles by molding or profile extruding a composition of the invention.

DETAILED DESCRIPTION OF THE INVENTION

Practice of the invention is applicable to any elastomer which has at least one C—H bond that can react with azide including copolymers with narrow and broad (including bimodal) weight distribution and comonomer distribution such as copolymers of ethylene with one or more monomers having unsaturation, preferably alpha olefins having more than 2 carbon atoms (preferably C3 to C20), (polymers such as ethylene-propylene copolymer and ethylene-octene copolymer), optionally with an additional monomers having at least two double bonds, for instance EPDM or EODM, that is ethylene-propylene-diene or ethylene-octene-diene).

Alpha olefins having more than 2 carbon atoms include propylene, 1-butene, 1-pentene, 1-hexene, 1-octene, 1-nonene, 1-decene, 1-unidecene, 1-dodecene and the like as well as 4-methyl-1-pentene, 4-methyl-1-hexene, 5-methyl-1-hexene, vinylcyclohexene, and the like and combinations thereof.

Interpolymers useful in the practice of the invention include monomers having at least two double bonds which are preferably dienes or trienes. Suitable diene and triene comonomers include 7-methyl-1,6-octadiene, 3,7-dimethyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,7-octadiene, 1,8-nonadiene, 1,9-decadiene, 1,10-undecadiene, bicyclo[2.2.1]hepta-2-5-diene (norbornadiene), tetracyclododecene, or mixtures thereof, preferably butadiene, hexadienes, and octadienes, most preferably 1,4-hexadiene, 4-methyl-1,4-hexadiene, 5-methyl-1,4-hexadiene, dicyclopentadiene, piperylene, bicyclo[2.2.1]hepta-2-5-diene (norbornadiene) and 5-ethylidene-2-norbornene (ENB).

Polyolefins are formed by means within the skill in the art. The alpha olefin monomers and optionally other addition polymerizable monomers are polymerized under conditions within the skill in the art, Such conditions include those utilized in processes involving Ziegler-Natta catalysts such as those disclosed in U.S. Pat. Nos. 4,076,698 (Anderson et al); 4,950,541 and the patents to which they refer, as well as U.S. Pat. No. 3,645,992 (Elston) as well as those processes utilizing metallocene and other single site catalysts such as exemplified by U.S. Pat. Nos., 4,937,299 (Ewen et al.), 5,218,071 (Tsutsui et al.), 5,278,272, 5,324,800, 5,084,534, 5,405,922, 4,588,794, 5,204,419 and the processes subsequently discussed in more detail.

In one embodiment, starting material polyolefins are preferably substantially linear ethylene polymers (SLEPs). The substantially linear ethylene polymers (SLEPs) are homogeneous polymers having long chain branching. They are disclosed in U.S. Pat. Nos. 5,272,236 and 5,278,272, the disclosures of which are incorporated herein by reference. SLEPs are available as polymers made by the Insite™ Process and Catalyst Technology such as Engage™ polyolefin elastomers (POEs) commercially available from DuPont Dow Elastomers LLC including Engage™ SM 8400, EG 8100, and CL 800. SLEPs can be prepared via the solution, slurry, or gas phase, preferably solution phase, polymerization of ethylene and one or more optional α-olefin comonomers in the presence of a constrained geometry catalyst, such as is disclosed in European Patent Application 416,815-A, incorporated herein by reference.

The substantially linear ethylene/α-olefin polymers are made by a continuous process using suitable constrained geometry catalysts, preferably constrained geometry catalysts as disclosed in U.S. application Ser. Nos.: 545,403, filed Jul. 3, 1990; 758,654, filed Sep. 12, 1991; 758,660, filed Sep. 12, 1991; and 720,041, filed Jun. 24, 1991, the teachings of all of which are incorporated herein by reference. The monocyclopentadienyl transition metal olefin polymerization catalysts taught in U.S. Pat. No. 5,026,798, the teachings of which is incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane, as well as inert, compatible, noncoordinating, ion forming compounds. Preferred cocatalysts are inert, noncoordinating, boron compounds.

The expression "continuous process" means a process in which reactants are continuously added and product is continuously withdrawn such that an approximation of a steady state (i.e. substantially constant concentration of reactants and product while carrying out the process) is achieved. The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers to be rheologically modified according to the present invention, such as those disclosed in U.S. Pat. No. 3,914,342, incorporated herein by reference. The multiple reactors can be operated in series or in parallel, with at least one constrained geometry catalyst employed in one of the reactors.

The term "substantially linear", means that, in addition to the short chain branches attributable to homogeneous comonomer incorporation, the ethylene polymer is further characterized as having long chain branches in that the polymer backbone is substituted with an average of 0.01 to 3 long chain branches/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branch/1000 carbons.

In contrast to the term "substantially linear", the term "linear" means that the polymer lacks measurable or demonstrable long chain branches, i.e., the polymer is substituted with an average of less than 0.01 long chain branch/1000 carbons.

For ethylene/α-olefin interpolymers, "long chain branching" (LCB) means a chain length longer than the short chain branch that results from the incorporation of the α-olefin(s) into the polymer backbone. Each long chain branch has the same comonomer distribution as the polymer backbone and can be as long as the polymer backbone to which it is attached.

The empirical effect of the presence of long chain branching in the substantial linear ethylene/α-olefin interpolymers used in the invention is manifested in its enhanced rheological properties which are quantified and expressed herein in terms of gas extrusion rheometry (GER) results and/or melt flow, $I_{10}/I_2$, increases.

The presence of short chain branching of up to 6 carbon atoms in length can be determined in ethylene polymers by using $^{13}C$ nuclear magnetic resonance (NMR) spectroscopy and is quantified using the method described by Randall (Rev. Macromol. Chem. Phys., C.29, V. 2&3, p. 285–297), the disclosure of which is incorporated herein by reference.

As a practical matter, current $^{13}C$ nuclear magnetic resonance spectroscopy cannot distinguish the length of a long chain branch in excess of six carbon atoms. However, there are other known techniques useful for determining the presence of long chain branches in ethylene polymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J.Chem. Phys., 17,1301 (1949) and Rudin, A., *Modern Methods of Polymer Characterization*, John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in SLEPs. In particular, deGroot and Chum found that the level of long chain branches in homogeneous substantially linear homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log ($I_2$) as a function of Log ($M_w$) as determined by GPC illustrates that the long chain branching aspects (but not the extent of long branching) of SLEPs are comparable to that of high pressure, highly branched low density polyethylene (LDPE) and are clearly distinct from ethylene polymers produced using Ziegler-type catalysts such as titanium complexes and ordinary catalysts for making homogeneous polymers such as hafnium and vanadium complexes.

SLEPs are further characterized as having:
 (a) a melt flow ratio, $I_{10}/I_2 \geq 5.63$,
 (b) a molecular weight distribution, $M_w/M_n$ as determined by gel permeation chromatography and defined by the equation:

$$(M_w/M_n) \leq (I_{10}/I_2) - 4.63,$$

(c) a critical shear stress at the onset of gross melt fracture, as determined by gas extrusion rheometry, of greater than $4 \times 10^6$ dynes/cm$^2$ or a gas extrusion rheology such that the critical shear rate at onset of surface melt fracture for the SLEP is at least 50 percent greater than the critical shear rate at the onset of surface melt fracture for a linear ethylene polymer, the linear ethylene polymer has an $I_2$, $M_w/M_n$ and, preferably density, which are each within ten percent of the SLEP and wherein the respective critical shear rates of the SLEP and the linear ethylene polymer are measured at the same melt temperature using a gas extrusion rheometer, and, preferably,
 (d) a single differential scanning calorimetry, DSC, melting peak between −30 and 150 C.

For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above, and as high as about 25.

The melt index for the substantially linear olefin polymers useful herein is preferably at least about 0.1 grams/10 minutes (g/10 min), more preferably at least about 0.5 g/10 min and especially at least about 1 g/10 min up to preferably about 100 g/10 min, more preferably up to about 50 g/10 min, and especially up to about 20 g/10 min.

Determination of the critical shear rate and critical shear stress in regards to melt fracture as well as other rheology properties such as rheological processing index (PI), is performed using a gas extrusion rheometer (GER). The gas extrusion rheometer is described by M. Shida, R. N. Shroff and L. V. Cancio in *Polymer Engineering Science,* Vol. 17, No. 11, p. 770 (1977), and in *Rheometers for Molten Plastics* by John Dealy, published by Van Nostrand Reinhold Co. (1982) on pp. 97–99, both of which are incorporated by reference herein in their entirety. GER experiments are generally performed at a temperature of 190 C, at nitrogen pressures between 250 to 5500 psig using a 0.0754 mm diameter, 20:1 L/D die with an entrance angle of 180°. For the SLEPs described herein, the PI is the apparent viscosity (in kpoise) of a material measured by GER at an apparent shear stress of $2.15 \times 10^6$ dyne/cm$^2$. The SLEPs for use in the invention includes ethylene interpolymers and have a PI in the range of 0.01 kpoise to 50 kpoise, preferably 15 kpoise or less. The SLEPs used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the SLEPs.

The rheological behavior of SLEPs can also be characterized by the Dow Rheology Index (DRI), which expresses a polymer's "normalized relaxation time as the result of long chain branching." (See, S. Lai and G. W. Knight *ANTEC '93 Proceedings,* INSITE™ Technology Polyolefins (SLEP)— New Rules in the Structure/Rheology Relationship of Ethylene α-Oefin Copolymers, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exact™ products available from Exxon Chemical Company) to about 15 and are independent of melt index. In general, for low to medium pressure ethylene polymers (particularly at lower densities) DRI provides improved correlations to melt elasticity and high shear flowability relative to correlations of the same attempted with melt flow ratios. For the SLEPs useful in this invention, DRI is preferably at least 0.1, and especially at least 0.5, and most especially at least 0.8. DRI can be calculated from the equation:

$$DRI = (3652879 * \tau_o^{1.00649}/\eta_o - 1)/10$$

where $\tau_o$ is the characteristic relaxation time of the material and $\eta_o$ is the zero shear viscosity of the material. Both $\tau_o$ and $\eta_o$ are the "best fit" values to the Cross equation, i.e., $$\eta/\eta_o = 1/(1+(\gamma \tau_o)^{1-n})$$

in which n is the power law index of the material, and η and γ are the measured viscosity and shear rate, respectively.

Baseline determination of viscosity and shear rate data are obtained using a Rheometric Mechanical Spectrometer (RMS-800) under dynamic sweep mode from 0.1 to 100 radians/second at 190 C and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at 190 C. Specific material determinations can be performed from 140 to 190 C as required to accommodate melt index variations.

An apparent shear stress versus apparent shear rate plot is used to identify the melt fracture phenomena and quantify the critical shear rate and critical shear stress of ethylene polymers. According to Ramamurthy in the Journal of Rheology, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is defined as the loss of extrudate gloss. The loss of extrudate gloss is the point at which the surface roughness of the extrudate can only be detected by a 40× magnification. The critical shear rate at the onset of surface melt fracture for the SLEPs is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the SLEPs, especially those having a density >0.910 g/cc, used in the invention is greater than $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

The SLEPs used in the invention are also characterized by a single DSC melting peak. The single melting peak is determined using a differential scanning calorimeter standardized with indium and deionized water. The method involves 3–7 mg sample sizes, a "first heat" to about 180° C. which is held for 4 minutes, a cool down at 10° C./min. to −30° C. which is held for 3 minutes, and heat up at 10° C./min. to 140° C. for the "second heat". The single melting peak is taken from the "second heat" heat flow vs. temperature curve. Total heat of fusion of the polymer is calculated from the area under the curve.

For polymers having a density of 0.875 g/cc to 0.910 g/cc, the single melting peak may show, depending on equipment sensitivity, a "shoulder or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

The molecular weight distributions of ethylene α-olefin polymers are determined by gel permeation chromatography (GPC) on a Waters 150C high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å ($10^{-4}$, $10^{-3}$, $10^{-2}$ and $10^{-1}$ mm). The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science,* Polymer Letters, Vol. 6, p. 621, 1968) to derive the following equation:

$$M_{polyethylene}=a * (M_{polystyrene})^b.$$

In this equation, a=0.4316 and b=1.0. Weight average molecular weight, $M_w$, is calculated in the usual manner according to the following formula: $Mj=(\Sigma w_i (M_i^j))^j$; where $w_i$ is the weight fraction of the molecules with molecular weight $M_i$ eluting from the GPC column in fraction i and j=1 when calculating $M_w$ and j=-1 when calculating $M_n$.

The density of the linear or the substantially linear ethylene polymers (as measured in accordance with ASTM D-792) for use in the present invention is generally less than about 0.90 g/cm³. The density is preferably at least about 0.85 g/cm³ and preferably up to about 0.90 g/cm³, more preferably up to about 0.88 g/cm³. The most preferred density is determined primarily by the modulus of elasticity or flexibility desired in for instance, a resulting molded article. The density advantageously remains substantially constant during rheology modification according to this invention.

The most preferred polymers as starting materials for this invention are ethylene copolymers with narrow MWD (that is a Mw/Mn of less than 3.5 most preferably less than about 2.5). These can be produced using at least one C3–C20 olefin comonomer. Most preferred for copolymer is C3–C10. About 3–30 mole percent comonomer as determined by ASTM 5017 is preferred in the starting material. The preferred melt index of the starting material is at least about 0.2, preferably up to about 20 g/20 min, or it preferably has Mooney viscosity of at least about 5, more preferably up to about 50 Mooney (as measured by ASTM D 1646–92 at 25° C.) run time of 9 minutes, 38.1 mm diameter rotor, rotor speed of 0.2 rad/sec. Commercially available polymers in this category include NORDEL and ENGAGE polyolefin elastomers commercially available from DuPont-Dow Elastomers and VISTALON elastomers commercially available from Exxon Chemicals. For elastomeric applications, the preferred comonomer content is between about 20–40 weight percent. The most preferred terpolymer is an EPDM such as NORDEL ethylene/propylene/diene polymer commercially available from DuPont-Dow Elastomers.

The melt index is measured according to ASTM D-1238 condition 190° C./2.16 Kg(formerly known as Condition E).

For the purposes of rheology modification or coupling, the polymer is reacted with a polyfunctional compound capable of insertion reactions into C—H bonds. Such polyfunctional compounds have at least two, preferably 2, functional groups capable of C—H insertion reactions. Those skilled in the art are familiar with C—H insertion reactions and functional groups capable of such reactions. For instance, carbenes as generated from diazo compounds, as cited in Mathur, N. C.; Snow, M. S.; Young, K. M., and Pincock, J. A.; *Tetrahedron,* (1985), 41(8), pages 1509–1516, and nitrenes as generated from azides, as cited in Abramovitch, R. A.,; Chellathurai, T.; Holcomb, W. D; McMaster, I. T.; and Vanderpool, D. P.; *J. Org. Chem.,* (1977), 42(17), 2920–6, and Abramovitch, R. A., Knaus, G. N., *J. Org. Chem.,* (1975), 40(7), 883–9.

Compounds having at least two functional groups capable of C—H insertion under reaction conditions are referred to herein as coupling agents. Such coupling agents include alkyl and aryl azides (R—$N_3$), acyl azides (R—C(O)$N_3$), azidoformates (R—O—C(O)—$N_3$), phosphoryl azides ((RO)$_2$—(PO)—$N_3$), phosphinic azides (R$_2$—P(O)—$N_3$) and silyl azides (R$_3$—Si—$N_3$).

Polyfunctional compounds capable of insertions into C—H bonds also include poly(sulfonyl azide)s. The poly (sulfonyl azide) is any compound having at least two sulfonyl azide groups (—SO$_2$N$_3$) reactive with the polyolefin. Preferably the poly(sulfonyl azide)s have a structure X—R—X wherein each X is SO$_2$N$_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1,5-pentane bis(sulfonlazide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

Polyfunctional compounds capable of insertions into C—H bonds also include carbene-forming compounds such as salts of alkyl and aryl hydrazones and diazo compounds, and nitrene-forming compounds such as alkyl and aryl azides (R—$N_3$), acyl azides (R—C(O)$N_3$), azidoformates (R—O—C(O)—$N_3$), sulfonyl azides (R—$SO_2$—$N_3$), phosphoryl azides ((RO)$_2$—(PO)—$N_3$), phosphinic azides ($R_2$—P(O)—$N_3$) and silyl azides ($R_3$—Si—$N_3$). Some of the coupling agents of the invention are preferred because of their propensity to form a greater abundance of carbon-hydrogen insertion products. Such compounds as the salts of hydrazones, diazo compounds, azidoformates, sulfonyl azides, phosphoryl azides, and silyl azides are preferred because they form stable singlet-state electron products (carbenes and nitrenes) which carry out efficient carbon-hydrogen insertion reactions, rather than substantially 1) rearranging via such mechanisms as the Curtius-type rearrangement, as is the case with acyl azides and phosphinic azides, or 2) rapidly converting to the triplet-state electron configuration which preferentially undergoes hydrogen atom abstraction reactions, which is the case with alkyl and aryl azides. Also, selection from among the preferred coupling agents is conveniently possible because of the differences in the temperatures at which the different classes of coupling agents are converted to the active carbene or nitrene products. For example, those skilled in the art will recognize that carbenes are formed from diazo compounds efficiently at temperatures less than 100° C., while salts of hydrazones, azidoformates and the sulfonyl azide compounds react at a convenient rate at temperatures above 100° C., up to temperatures of about 200° C. (By convenient rates it is meant that the compounds react at a rate that is fast enough to make commercial processing possible, while reacting slowly enough to allow adequate mixing and compounding to result in a final product with the coupling agent adequately dispersed and located substantially in the desired position in the final product. Such location and dispersion may be different from product to product depending on the desired properties of the final product.) Phosphoryl azides may be reacted at temperatures in excess of 180° C. up to about 300° C., while silyl azides react preferentially at temperatures of from about 250° C. to 400° C.

To modify rheology, also referred to herein as "to couple," the poly(sulfonyl azide) is used in a rheology modifying amount, that is an amount effective to increase the low-shear viscosity (at 0.1 rad/sec) of the polymer preferably at least about 5 percent as compared with the starting material polymer, but less than a crosslinking amount, that is an amount sufficient to result in at least about 10 weight percent gel as measured by ASTM D2765-procedure A. While those skilled in the art will recognize that the amount of azide sufficient to increase the low shear viscosity and result in less than about 10 weight percent gel will depend on molecular weight of the azide used and polymer the amount is preferably less than about 5 percent, more preferably less than about 2 percent, most preferably less than about 1 weight percent poly(sulfonyl azide) based on total weight of polymer when the poly(sulfonyl azide) has a molecular weight of from about 200 to about 2000. To achieve measurable rheology modification, the amount of poly(sulfonyl azide) is preferably at least about 0.01 weight percent, more preferably at least about 0.05 weight percent, most preferably at least about 0.10 weight percent based on total polymer.

For rheology modification, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide) begins to react at a kinetically significant rate (convenient for use in the practice of the invention) at temperatures of about 130° C. and is almost completely reacted at about 160° C. in a DSC (scanning at 10° C./min). ARC (scanning at 2° C./hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the temperature is advantageously greater than about 90° C., preferably greater than about 120° C., more preferably greater than about 150° C., most preferably greater than 180° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC is about 5 half lives of the coupling agent. In the case of a bis(sulfonyl azide), for instance, the reaction time is preferably at least about 4 minutes at 200° C.

Admixing of the polymer and coupling agent is conveniently accomplished by any means within the skill in the art. Desired distribution is different in many cases, depending on what rheological properties are to be modified. In a homopolymer it is desirable to have as homogeneous a distribution as possible, preferably achieving solubility of the azide in the polymer melt. In a blend it is desirable to have low solubility in one or more of the polymer matrices such that the azide is preferentially in one or the other phase, or predominantly in the interfacial region between the two phases Preferred processes include at least one of (a) dry blending the coupling agent with the polymer, preferably to form a substantially uniform admixture and adding this mixture to melt processing equipment, e.g. a melt extruder to achieve the coupling reaction, at a temperature at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer and optionally other additives, is conveniently admixed into a second polymer or combination thereof optionally with other additives, to modify the second polymer(s)); (d) feeding at least one coupling agent, preferably in solid form, more preferably finely comminuted, e.g. powder, directly into softened or molten polymer, e.g. in melt processing equipment, e.g. in an extruder; or combinations thereof. Among processes (a) through (d), processes (b) and (c) are preferred, with (c) most preferred. For example, process (c) is conveniently used to make a concentrate with a first polymer composition having a lower melting temperature, advantageously at a temperature below the decomposition temperature of the coupling agent, and the concentrate is melt blended into a second polymer composition having a higher melting temperature to complete the coupling reaction. Concentrates are especially preferred when temperatures are sufficiently high to result in loss of coupling agent by evaporation or decomposition not leading to reaction with the polymer, or other conditions would result that effect. Alternatively, some coupling occurs during the blending of the first polymer and coupling agent, but some of the coupling agent remains unreacted until the concentrate is blended into the second polymer composition. Each polymer or polymer composition includes at least one homopolymer, copolymer, terpolymer, or interpolymer and optionally includes additives within the skill in the art. When the coupling agent is added in a dry form it is preferred to mix the agent and polymer in a softened or molten state below the decomposition temperature of the coupling agent then to heat the resulting admixture to a temperature at least equal to the decomposition temperature of the coupling agent.

The term "melt processing" is used to mean any process in which the polymer is softened or melted, such as extrusion, pelletizing, molding, thermoforming, film blowing, compounding in polymer melt form, fiber spinning, and the like.

The polyolefin(s) and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place. A substantially uniform admixture is one in which the distribution of coupling agent in the polymer is sufficiently homogeneous to be evidenced by a polymer having a melt viscosity after treatment according to the practice of the invention either higher at low angular frequency (e.g. 0.1 rad/sec) or lower at higher angular frequency (e.g. 100 rad/sec) than that of the same polymer which has not been treated with the coupling agent but has been subjected to the same shear and thermal history. Thus, preferably, in the practice of the invention, decomposition of the coupling agent occurs after mixing sufficient to result in a substantially uniform admixture of coupling agent and polymer. This mixing is preferably attained with the polymer in a molten or melted state, that is above the crystalline melt temperature, or in a dissolved or finely dispersed condition rather than in a solid mass or particulate form. The molten or melted form is more preferred to insure homogeniety rather than localized concentrations at the surface.

Any equipment is suitably used, preferably equipment which provides sufficient mixing and temperature control in the same equipment, but advantageously practice of the invention takes place in such devices as an extruder or a static polymer mixing devise such as a Brabender blender. The term extruder is used for its broadest meaning to include such devices as a device which extrudes pellets or pelletizer. Conveniently, when there is a melt extrusion step between production of the polymer and its use, at least one step of the process of the invention takes place in the melt extrusion step. While it is within the scope of the invention that the reaction take place in a solvent or other medium, it is preferred that the reaction be in a bulk phase to avoid later steps for removal of the solvent or other medium. For this purpose, a polymer above the crystalline melt temperature is advantageous for even mixing and for reaching a reaction temperature (the decomposition temperature of the sulfonyl azide).

In a preferred embodiment the process of the present invention takes place in a single vessel, that is mixing of the coupling agent and polymer takes place in the same vessel as heating to the decomposition temperature of the coupling agent. The vessel is preferably a twin-screw extruder, but is also advantageously a single-screw extruder or a batch mixer. The reaction vessel more preferably has at least two zones of different temperatures into which a reaction mixture would pass, the first zone advantageously being at a temperature at least the crystalline melt temperature or the softening temperature of the polymer(s) and preferably less than the decomposition temperature of the coupling agents and the second zone being at a temperature sufficient for decomposition of the coupling agent. The first zone is preferably at a temperature sufficiently high to soften the polymer and allow it to combine with the coupling agent through distributive mixing to a substantially uniform admixture.

For polymers that have softening points above the coupling agent decomposition temperature (preferably greater than 200° C.), and especially when incorporation of a lower melting polymer (such as in a concentrate) is undesirable, the preferred embodiment for incorporation of coupling agent is to solution blend the coupling agent in solution or admixture into the polymer, to allow the polymer to imbibe (absorb or adsorb at least some of the coupling agent), and then to evaporate the solvent. After evaporation, the resulting mixture is extruded. The solvent is preferably a solvent for the coupling agent, and more preferably also for the polymer when the polymer is soluble such as in the case of polycarbonate. Such solvents include polar solvents such as acetone, THF (tetrahydrofuran) and chlorinated hydrocarbons such as methylene chloride. Alternatively other non-polar compounds such as mineral oils in which the coupling agent is sufficiently miscible to disperse the coupling agent in a polymer, are used.

To avoid the extra step and resultant cost of re-extrusion and to insure that the coupling agent is well blended into the polymer, in alternative preferred embodiments it is preferred that the coupling agent be added to the post-reactor area of a polymer processing plant. For example, in a slurry process of producing polyethylene, the coupling agent is added in either powder or liquid form to the powdered polyethylene after the solvent is removed by decantation and prior to the drying and densification extrusion process. In an alternative embodiment, when polymers are prepared, in a gas phase process, the coupling agent is preferably added in either powder or liquid form to the powdered polyethylene before the densification extrusion. In an alternative embodiment when a polymer is made in a solution process, the coupling agent is preferably added to the polymer solution prior to the densification extrusion process.

Practice of the process of the invention to rheology modify elastomers yields rheology modified or chain coupled elastomers, that is the polymers which have sulfonamide, amine, alkyl-substituted or aryl-substituted carboxamide, alkyl-substituted or aryl-substituted phosphoramide, alkyl-substituted or aryl-substituted methylene coupling between different polymer chains. Resulting elastomers advantageously show higher low shear viscosity than the original polymer due to coupling of long polymer chains to polymer backbones. Broad molecular weight distribution polymers (polydispersity (P.D.) of 3.5 and greater) and gel levels less than 2 percent as determined by xylene extraction show less improvement than the dramatic effect noted in narrow MWD polymer (P.D.=2.0) with gel less than 2 percent as determined by xylene extraction.

Rheology modification leads to polymers which have controlled rheological properties, specifically improved melt strength as evidenced by increased low shear viscosity, better ability to hold oil, improved scratch and mar resistance, improved tackiness, improved green strength (melt), higher orientation in high shear and high extensional processes such as injection molding, film extrusion (blown and cast), calendaring, fiber production, profile extrusion, foams, and wire & cable insulation as measured by tan delta as described hereinafter, elastic viscosity at 0.1 rad/sec and 100 rad/sec, respectively. It is also believed that this process can be used to produce dispersions having improved properties of higher low shear viscosity than the unmodified polymer as measured by DMS.

Rheology modified elastomers are useful as large blow-molded articles due to the higher low shear viscosity than unmodified polymer and the maintenance of the high shear viscosity for processability as indicated by high shear viscosity, foams for stable cell structure as measured by low shear viscosity, elastic film for better bubble stability as measured by low shear viscosity, elastic fibers for better spinnability as measured by high shear viscosity, cable and wire insulation for green strength to avoid sagging or deformation of the polymer on the wire as measured by low shear viscosity which are aspects of the invention.

Elastomers rheology modified according to the practice of the invention are superior to the corresponding unmodified polymer starting materials for these applications due to the elevation of viscosity, of preferably at least about 5 percent at low shear rates (0.1 rad/sec), sufficiently high melt strengths to avoid deformation during thermal processing (e.g. to avoid sag during thermoforming) or to achieve bubble strength during blow molding, and sufficiently low high shear rate viscosities to facilitate molding and extrusion. These rheological attributes enable faster filling of injection molds at high rates than the unmodified starting materials, the setup of foams (stable cell structure)as indicated by formation of lower density closed cell foam, preferably with higher tensile strength, insulation properties, and/or compression set than attained in the use of coupling or rheology modification using coupling agents which generate free radicals, because of high melt viscosity. Advantageously toughness and tensile strength of the starting material is maintained.

Polymers resulting from the practice of the invention are different from those resulting from practice of prior art processes as shown in CA 797,917. The polymers of the present invention show improved melt elasticity, that is higher tan delta as measured by DMS, better drawability, that is higher melt strength as measured by melt tension, than the unmodified polymer counterpart in thermoforming and large part blow molding.

There are many types of molding operations which can be used to form useful fabricated articles or parts from the formulations disclosed herein, including various injection molding processes (e.g., that described in *Modern Plastics Encyclopedia*/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encyclopedia*/89, Mid October 1988 Issue, Volume 65, Number 11, pp. 217–218, "Extrusion-Blow Molding", the disclosure of which is incorporated herein by reference), profile extrusion, calendering, pultrusion and the like.

The rheology-modified ethylene polymers, processes for making them, and intermediates for making them of this invention are useful in the automotive area, industrial goods, building and construction, electrical (e.g., wire and cable coatings/insulation) and tire products. Some of the fabricated articles include automotive hoses, tubing, and sheet (for instance, skins for instrument panel, car door and seat), single ply roofing, and wire and cable voltage insulation and jackets. In thermoset elastomer applications, the elastomer is traditionally first fabricated into a part, and then the resulting part is crosslinked. Practice of the invention provides enhanced melt strength to the resin such that it can be shaped or fabricated into parts advantageously substantially without severe deformation due to low melt strength. For example, in wire and cable applications, enhanced melt strength polymers allow the wire to be more effectively coated without the coating sagging with the resulting thickness variation around the circumference of the cable. The effect of improved melt strength is also applicable to profile extrusions where the enhanced melt strength is advantageous to forming a uniform diameter for tubing or uniform thickness for gaskets and seals.

Elastic film and film structures particularly benefit from this invention and can be made using conventional blown film fabrication techniques or other biaxial orientation processes such as tenter frames or double bubble processes. Conventional blown film processes are described, for example, in *The Encyclopedia of Chemical Technology*, Kirk-Othmer, Third Edition, John Wiley & Sons, New York, 1981, vol. 16, pp. 416–417 and Vol. 18, pp. 191–192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compositions described herein. The film structures can also be made as described in a tenter-frame technique, such as that used for oriented polypropylene.

Other multi-layer elastic film manufacturing techniques for food packaging applications are described in *Packaging Foods With Plastics*, by Wilmer A. Jenkins and James P. Harrington (1991), pp. 19–27, and in "Coextrusion Basics" by Thomas I. Butler, *Film Extrusion Manual: Process, Materials, Properties* pp. 31–80 (published by the TAPPI Press (1992)).

The elastic films may be monolayer or multilayer films. The film made using this invention can also be coextruded with the other layer(s) or the film can be laminated onto another layer(s) in a secondary operation, such as that described in *Packaging Foods With Plastics*, by Wilmer A. Jenkins and James P. Harrington (1991) or that described in "Coextrusion For Barrier Packaging" by W. J. Schrenk and C. R. Finch, *Society of Plastics Engineers RETEC Proceedings*, Jun. 15–17 (1981), pp. 211–229. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc., 1992), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations vs. Coextrusion" by D. Dumbleton (Converting Magazine (September 1992), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terethphalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to 7 layers.

The rheology modified elastomer can be used to extrusion coat onto a woven polypropylene or woven high density polyethylene scrim for tarp applications.

Such articles comprising the rheology-modified polymer of this invention may be made by melt processing the rheology-modified elastomer according to this invention. That process may include processing pellets or granules of polymer which have been rheology-modified according to this invention. In a preferred embodiment, the pellets or granules are substantially free of unreacted crosslinking agent when the crosslinking agent comprises a heat-activated crosslinking agent.

Articles prepared from the rheology modified elastomers are optionally and advantageously crosslinked subsequent to shaping (fabrication). Crosslinking before fabrication often results in localized gels that undesirably introduce flaws. Flaws are sometimes visible or can reduce such characteristics as tensile properties or toughness of the final article, crosslinking after fabrication. Introduced in a step subsequent to fabrication, crosslinking is advantageously distributed evenly in the resulting article so that the reduction in tensile properties is minimized. Crosslinking in a subsequent step is optionally accomplished using any means within the skill in the art, for instance radiation, including e-beam radiation, or heat. In the case crosslinking by heat, peroxide, azide and other crosslinking agents are conveniently added before the article is fabricated and the fabrication temperature is desirably lower than the decomposition of the crosslinking agent. One means within the skill in the art for achieving a sufficiently low fabrication temperature is adding oil to the resin to reduce the viscosity. The crosslinked article advantageously has lower compression set as measured by ASTM D 395-89 than the article prior to crosslinking. Such articles are optionally and alternatively made by melt processing an intermediate composition comprising a rheology modified elastomer of the invention which contains unreacted crosslinking agent. The crosslinking agent is optionally included in a composition including the poly(sulfonyl azide) before the decomposition temperature of the poly(sulfonyl azide) is reached or alternatively added after coupling. If the crosslinking agent is added before the decomposition temperature of the poly(sulfonyl azide) is reached, then the crosslinking agent should be insufficiently reactive under coupling conditions to cause sufficient crosslinking to introduce detrimental amounts of localized gels (Those skilled in the art will recognize that the amounts of gel which are detrimental vary with the final article to be produced.) In such a case the crosslinking agent is conveniently activated at a higher temperature or by different conditions than are occur in coupling. More preferably, crosslinking agent is added to coupled elastomer or the fabricated article is exposed to radiation. In another embodiment, an amount of poly(sulfonyl azide) sufficient for coupling and later crosslinking is used in a composition and exposed to sufficient heat for a sufficient time to couple the elastomer but to form less than about 2 weight percent gel, then the composition is fabricated into an article, after which the article is heated to decompose sufficient poly(sulfonyl azide) to result in crosslinking. Oils, plasticizers, fillers, colorants, and antioxidants are optionally added to the rheology modified elastomers during the article fabrication process. Examples of the use of rheology modified elastomers in crosslinked elastomer applications include gaskets, wire and cable coatings, roofing membranes, foams, weather stripping, hoses and the like where the parts advantageously have low compression set and elevated service temperature.

The rheology-modified polymers and intermediates used to make rheology-modified polymers may be used alone or in combination with one or more additional polymers in a polymer blend. When additional polymers are present, they may be selected from any of the modified or unmodified homogeneous polymers described above for this invention and/or any modified or unmodified heterogeneous polymers.

Compositions of the invention and compositions produced by practice of the invention are particularly useful because of their surprising properties. The low density ethylene copolymer preferred embodiments (density less than about 0.89 g/mL and comonomer content preferably about 5–25 mole percent) are particularly useful in extrusion such as to form wire and cable coatings, tubing, profiles such as gaskets and seals, sheeting, extrusion coatings such as carpet backing, multilayer packaging, tougheners, and impact modifiers for blends of polymers, preferably for wire and cable coating, tougheners and impact modifiers. The low density preferred embodiments are also particularly useful for calendaring to form such materials as sheeting, packaging films, and non-packaging films; for foams particularly cushion packaging, toys, building and construction uses, automotive uses, such as overhead and insulation foams, body boards, airline seats, floral and craft uses, preferably cushion packaging, building and construction, automotive uses, and body boards; and for adhesives and sealants, particularly hot melt adhesives, pressure sensitive adhesives (whether applied in solvents or by hot melt), caulks, and as tackifiers in other compositions.

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention.

Test Methods

A Rheometrics, Inc. RMS-800 dynamic mechanical spectrometer (DMS) with 25 mm diameter parallel plates was used to determine the dynamic rheological data. A frequency sweep with five logarithmically spaced points per decade was run from 0.1 to 100 rad/s at 190° C. The strain was determined to be within the linear viscoelastic regime by performing a strain sweep at 0.1 rad/s and 190° C., by strain sweep from 2 to 30 percent strain in 2 percent steps to determine the minimum required strain to produce torques within the specification of the transducer; another strain sweep at 100 rad/s and 190° C. was used to determine the maximum strain before nonlinearity occurred according to the procedure disclosed by J. M. Dealy and K. F. Wissbrun, "Melt Rheology and Its Role in Plastics Processing", Van Nostrand, N.Y. (1990). All testing was performed in a nitrogen purge to minimize oxidative degradation.

Xylene Extraction was performed by weighing out 1 gram samples of polymer. The samples are transferred to a mesh basket which is then placed in boiling xylene for 12 hours. After 12 hours, the sample baskets are removed and placed in a vacuum oven at 150° C. and 28 in. of Hg vacuum for 12 hours. After 12 hours, the samples are removed, allowed to cool to room temperature over a 1 hour period, and then weighed. The results are reported as percent polymer extracted. Percent extracted=(initial weight-final weight)/initial weight according to ASTM D-2765 Procedure "A". Samples were prepared using a HaakeBuchler Rheomix 600 mixer with roller style blades, attached to a HaakeBuchler Rheocord 9000 Torque rheometer.

All instruments were used according to manufacturer's directions.

EXAMPLES 1 AND 2 AND COMPARATIVE SAMPLE A

A 43 g sample of an ethylene (69 weight percent) propylene (30.5 weight percent) 5-ethylidene-2-norbornene(ENB) (0.5 weight percent)terpolymer with specific gravity 0.88, Mooney viscosity 20 (by ASTM D 1646-92) Mw/Mn=3.86 and Mw=146,200 commercially available from DuPont Dow Elastomers LLC under the trade designation Nordel IP NDR 3720 hydrocarbon rubber (containing 1000 ppm hindered polyphenolic stabilizer commercially available from Ciba Geigy Corporation under the trade designation Irganox 1076 stabilizers) was mixed in a Haake mixer. The polymer was prepared using a constrained geometry catalyst. The polymer was melted at 100° C. for 2 minutes until all pellets were molten. Then 0.05 weight percent of 4,4'-oxybis (benzenesulfonyl azide) CAS# [7456-68-0] was mixed into the molten polymer for 2 minutes. After intimate mixing was achieved, the temperature was adjusted to 170° C. and the rotational speed was increased from 20 to 40 rpm over a period of 7 minutes to reach a maximum of 180° C. The mixture is held at this higher temperature and high rotational speed for 12 minutes, and then it was cooled to 150° C. The sample was removed from the Haake and allowed to cool to room temperature.

For Example 2 the procedure of Example 1 was repeated but using 0.1 weight percent 4,4'-oxybis(benzenesulfonyl azide). Comparative Sample A was the same starting material not treated with poly(sulfonyl azide).

Rheological properties (viscosity and tan delta) were measured for each sample plus an unmodified control (Comparative Sample A) at 190° C. over a frequency range of 0.1 to 100 rad/second using a Rheometrics mechanical spectrometer equipped with parallel 25 mm diameter plates according to manufactures directions. The low shear viscosity is the viscosity measured at the lowest frequency. The high shear viscosity was determined by DMS at 100 rad/sec. The results of these tests are in Table 1.

EXAMPLES 3 AND 4 AND COMPARATIVE SAMPLE B

The procedure of Example 1 is repeated using an ethylene (72 weight percent) propylene (22 weight percent) ENB (6 weight percent)terpolymer with specific gravity 0.87, at 22.4° C., Mw/Mn=3.65 and Mw=115, 200, Mooney viscosity 20, commercially available from DuPont Dow Elastomers LCC under the trade designation Nordel 2722 hydrocarbon rubber (a Ziegler Natta catalyzed EPDM) containing 2000 ppm Irganox 1076 stabilizer with 0.05 weight percent of 4,4'-oxybis(benzenesulfonyl azide) CAS# [7456-68-0] for Example 3, but using 0.1 weight percent for Example 4 and no poly(sulfonyl azide) for C.S. B.

EXAMPLES 5 AND 6 AND COMPARATIVE SAMPLE C

The procedure of Example 1 is repeated using an ethylene (71 weight percent)propylene (23 weight percent) ENB (6 weight percent)terpolymer with Mw/Mn=2.98 and Mw=173,200, Mooney viscosity 45±6 by ASTM D 1646, commercially available from DuPont Dow Elastomers under the trade designation Nordel 2744 hydrocarbon rubber (a Ziegler Natta catalyzed EPDM) containing 2000 ppm Irganox 1076 stabilizer with 0, 0.05, and 0.1 weight percent of 4,4'-oxybis(benzenesulfonyl azide) CAS# [7456-68-0] for C.S. C, Example 5, and Example 6, respectively.

TABLE 1

| | Viscosity measurements in English units | | | | | | |
|---|---|---|---|---|---|---|---|
| | Visc 0.1 poise | Visc 100 poise | Visc 0.1/100 | Tan 0.1 | % Visc 0.1 Change | % Visc 10 Change | % Tan Change |
| C.S. A | 2.55E+05 | 1.32E+04 | 19.30 | 2.1627 | 0 | 0 | 0 |
| Ex. 1 | 3.75E+05 | 1.36E+04 | 27.49 | 1.2659 | 47 | 3 | −41 |

TABLE 1-continued

Viscosity measurements in English units

|       | Visc 0.1 poise | Visc 100 poise | Visc 0.1/100 | Tan 0.1 | % Visc 0.1 Change | % Visc 10 Change | % Tan Change |
|-------|---------------|----------------|--------------|---------|-------------------|------------------|--------------|
| Ex. 2 | 5.18E+05 | 1.36E+04 | 37.97 | 0.838 | 103 | 3 | −61 |
| C.S. B | 8.26E+05 | 1.31E+04 | 62.84 | 0.992 | 0 | 0 | 0 |
| Ex. 3 | 5.92E+05 | 1.31E+04 | 45.34 | 1.2753 | −28 | −1 | 29 |
| Ex. 4 | 9.29E+05 | 1.49E+04 | 62.55 | 1.0214 | 13 | 13 | 3 |
| C.S. C | 2.07E+06 | 2.24E+04 | 92.54 | 0.6482 | 0 | 0 | 0 |
| Ex. 5 | 2.18E+06 | 2.32E+04 | 94.18 | 0.6185 | 5 | 4 | −5 |
| Ex. 6 | 3.37E+06 | 2.33E+04 | 144.78 | 0.4572 | 63 | 4 | −29 |

TABLE 1b[1]

Summary of Melt Rheological Results in metric units
(all viscosities in Pa-S (Pascal seconds))

|       | Visc 0.1 Pa-S | Visc 100 Pa-S | Visc 0.1/100 | Tan 0.1 | % Visc 0.1 Change | % Visc 10 Change | % Tan Change |
|-------|---------------|----------------|--------------|---------|-------------------|------------------|--------------|
| C.S. A | 2.55E+04 | 1.32E+03 | 19.30 | 2.1627 | 0 | 0 | 0 |
| Ex. 1 | 3.75E+04 | 1.36E+03 | 27.49 | 1.2659 | 47 | 3 | −41 |
| Ex. 2 | 5.18E+04 | 1.36E+03 | 37.97 | 0.838 | 103 | 3 | −61 |
| C.S. B | 8.26E+04 | 1.31E+03 | 62.84 | 0.992 | 0 | 0 | 0 |
| Ex. 3 | 5.92E+04 | 1.31E+03 | 45.34 | 1.2753 | −28 | −1 | 29 |
| Ex. 4 | 9.29E+04 | 1.49E+03 | 62.55 | 1.0214 | 13 | 13 | 3 |
| C.S. C | 2.07E+05 | 2.24E+03 | 92.54 | 0.6482 | 0 | 0 | 0 |
| Ex. 5 | 2.18E+05 | 2.32E+03 | 94.18 | 0.6185 | 5 | 4 | −5 |
| Ex. 6 | 3.37E+05 | 2.33E+03 | 144.78 | 0.4572 | 63 | 4 | −29 |

For the three EPDM samples prepared using 0.1 weight percent poly(sulfonyl azide) (Examples 2, 4 and 6), the largest degree of rheology modification was seen for the Example 2 which was prepared using metallocene catalyst. The low shear viscosity (viscosity 0.1 rad/s) increased by 103 percent over that of the base polymer with the higher shear viscosities increasing less substantially at 3 percent at 100 rad/s and 22 percent at 1000 1/s. Thus, a substantial increase in low shear viscosity (100 percent at 0.1 rad/s) correlatable with increases in melt strength was observed for a metallocene based EPDM with less substantial changes in high shear viscosity (3 percent at 100 rad/s) reflecting good processability. The melt rheological behavior, however, shows the largest overall differences between the comparative samples (not subjected to coupling reactions) due to coupling in the practice of the invention.

EXAMPLES 7, 8, AND 9, AND C.S. D

The procedure of Example 1 was repeated for Ex. 7, 8, and 9, and C.S. D except that 193 g of Nordel IP NDR 3720 hydrocarbon rubber having a composition defined in Example 1) and the amounts of 4,4'-oxybis(benzenesulfonyl azide) CAS# [7456-68-0] as listed in Table 2 were used.

TABLE 2

Effect of Azide Amount on the rheology and Gel content of EPDM

| Sample N | Azide ppm | Mooney Viscosity | 0.1 Rad Viscosity PaS | 100 Rad Viscosity PaS | % 0.1 Rad Viscosity change | 0.1 vis to 100 vis ratio | % Gel |
|----------|-----------|------------------|-----------------------|-----------------------|----------------------------|--------------------------|-------|
| C.S. A | 0 | 18.0 | 2.55E4 | 1.35E3 | | 18.9 | |
| Ex. 7 | 500 | 21 | 3.97E4 | 1.26E3 | 56 | 31.5 | 0.08 |
| Ex. 8 | 1000 | 27 | 5.90E4 | 1.20E3 | 131 | 49.2 | 0.26 |
| Ex. 9 | 1500 | 32.4 | 9.20E4 | 1.37E3 | 261 | 67.2 | 1.5 |
| C.S. D | 2000 | 38.6 | 1.55E5 | 1.63E3 | 506 | 95.1 | 34.2 |

Examples 7–9 and Comparative Samples A–D show that the Mooney viscosities can be modified significantly for a variety of EPDM's. The relative amount of poly(sulfonyl azide) used depends on the original Mooney viscosity and diene content. The relative amount of the sulfonyl azide is adjusted so that the final product has gel content less than 2 percent.

The data in Tables 1 and 2 show that poly(sulfonyl azide) can modify a variety of EPDM's including those made using Ziegler Natta or metallocene complex catalysts, preferably constrained geometry catalysts. The results from Table 2 indicate that, in Example 9, the Nordel IP 3720 hydrocarbon rubber (made using a constrained geometry catalyst) modified with 1500 ppm of sulfonyl azide has a higher melt strength (0.1 Rad shear viscosity) or Mooney viscosity than C.S. B in Table 1, the Nordel 2722 EPDM hydrocarbon rubber, which is known to those skilled in the art to be used in wire and cable applications. Both Example 9 and C.S. B have a comparable desirable shear thinning effect that is expressed by the ratio of 0.1 Rad viscosity to 100 Rad shear viscosity. One significance of this result is that the product of desired shear thinning effect no longer has to be made in the reactor (by varying reactor conditions and feeds), but can now be made post-reactor by reaction with a poly(sulfonyl azide). The amount of poly(sulfonyl azide) needed for the predetermined final properties depends on the amount of modification needed for the application performance requirements. Higher amounts of poly(sulfonyl azide) can lead to more than optimal gel; therefore, the amount of poly(sulfonyl azide) is preferably kept sufficiently low to maintain less than about 2.0 weight percent gel. High gel content reduces the processability during fabrication process and reduces the mechanical properties of the final parts.

EXAMPLES 10 AND 11 AND COMPARATIVE SAMPLE E

The procedure of Example 1 was repeated using a substantially linear ethylene/octene copolymer with $I_2=1$ g/10 minutes and density of 0.870 g/cm$^3$.commercially available from DuPont Dow Elastomers LLC under the trade designation ENGAGE™ EG8100 with 0, 0.05, and 0.1 weight percent of 4,4'-oxybis(benzenesulfonyl azide) CAS# [7456-68-0] for C.S.E, Example 10, and Example 11, respectively.

EXAMPLES 12 AND 13 AND COMPARATIVE SAMPLE F

The procedure of Example 1 is repeated using a linear ethylene-propylene copolymer with Mw/Mn=2.02, Mw=122,000 $I_2$=1.1 g/10 minutes and density of 0.87 g/cm$^3$ commercially available from Mitsui Petrochemical Industries under the trade designation Tafmer™ P0480 with 0, 0.05, and 0.1 weight percent of 4,4'-oxybis(benzenesulfonyl azide) CAS# [7456-68-0] for C.S. F, Example 13, and Example 14, respectively.

ture reached a maximum of 190° C. believed to be mainly from friction of stirring. The mixture is held at this higher temperature and high rotational speed for 5 minutes, and then the stirring was decreased to 20 rpm and the mixture was cooled to 150° C. The sample was removed from the Haake and allowed to cool to room temperature. This is not an example of the invention because there is 26.9 weight percent gel.

The procedure of C.S. H was repeated but using 0.2, 0.15, 0.1 and 0 weight percent 4,4'-oxybis(benzenesulfonyl azide)] for Examples 14, 15, and 16, and CS G respectively. Properties of the resulting products were tested and are in Table 4.

TABLE 4

Effect of Azide on Rheolgy and Gel Content for Ethylene Octene Copolymer

| Example or sample no. | sulfonyl azide (ppm) | Viscosity at 0.1 Rad Pa-s | 0.1/100 Viscosity | MOONEY | GELS (percent) |
|---|---|---|---|---|---|
| C.S. G | 0 | 0.94E4 | 5.8 | 17.6 | N/M |
| C.S. H | 2500 | 21.86E4 | 128.6 | 84.5 | 26.9 |
| Ex. 14 | 2000 | 11.64E4 | 62.3 | 47.9 | 0.209 |
| Ex. 15 | 1500 | 6.95E4 | 38.8 | 32.5 | 0.165 |
| Ex. 16 | 1000 | 3.89E4 | 23.6 | 24.0 | 0.173 |

N/M means not measured

The data in Table 4 indicate that poly(sulfonyl azide) is effective in rheology modification of ethylene-octene copolymer elastomers. The amount of azide can be con-

TABLE 3

Summary of Melt Rheological Results in metric units (all viscosities in Pa-S (Pascal seconds))

| Example or Comparative Sample | Visc 0.1 Pa-S | Visc 100 Pa-S | Visc 0.1/100 | Tan 0.1 | % Visc 0.1 Change | % Visc 10 Change | % Tan Change | Visc 1000 Pa-S | % Visc Change |
|---|---|---|---|---|---|---|---|---|---|
| C.S. E | 9.28E+03 | 1.67E+03 | 5.55 | 8.2516 | 0 | 0 | 0 | 416.44 | 0 |
| Ex. 10 | 1.89E+04 | 1.68E+03 | 11.26 | 2.9234 | 104 | 1 | −65 | 443.31 | 6 |
| Ex. 11 | 4.33E+04 | 1.87E+03 | 23.09 | 1.5487 | 366 | 12 | −81 | 499.49 | 20 |
| C.S. F | 1.18E+04 | 2.96E+03 | 3.98 | 9.6377 | 0 | 0 | 0 | 443.31 | 0 |
| Ex. 12 | 5.56E+04 | 2.54E+03 | 21.93 | 1.4587 | 371 | −14 | −85 | 433.64 | −2 |
| Ex. 13 | 7.21E+04 | 3.00E+03 | 24.04 | 1.2873 | 511 | 1 | −87 | 436.59 | −2 |

The results from C.S. E, Example 10, and Example 11 indicate that the melt strength of the elastomer from ethylene-octene copolymer increases significantly with the poly(sulfonyl azide) treatment. Similar results are obtained for the ethylene propylene elastomer of Examples 12 and 13.

Sample Preparation of C.S. G, C.S. H, Ex.14. Ex.15, and Ex.16

A 200 g mixer commercially available from Haake Inc. under the trade designation Rheomix 6000 was used. For Comparative Sample H 193 g sample of a substantially linear ethylene/octene copolymer with $I_2$=1 g/10 minutes and density of 0.870 g/cm$^3$ commercially available from DuPont Dow Elastomers LLC under the trade designation ENGAGE™ EG8100 was melted in the mixer at 126° C. while being stirred at 20 rpm for 3 minutes until all pellets were molten. Then 0.250 weight percent of 4,4'-oxybis (benzenesulfonyl azide) CAS# [7456-68-0] was mixed into the molten polymer for 2 minutes at the same stirring speed. After intimate mixing was achieved, the temperature set was adjusted to 160° C. and the rotational speed was increased from 20 to 75 rpm over a period of 7 minutes and temperatrolled to make the rheology modified ethylene-octene copolymer with gel content less than 2 percent. The comparison of data of Example 14 and C.S. D indicate that an ethylene-octene copolymer has less tendency to form gel than EPDM, that is, the rheology modified EPDM with 2000 ppm poly(sulfonyl azide)(C.S. D) has much higher gel than ethylene-octene copolymer using the same amount of poly (sulfonyl azide)(Ex. 14). The data of sample Ex. 14 indicate that the rheology modified ethylene-octene copolymer has a comparable shear thinning effect (ratio of viscosity at 0.1 Rad/s to 100 rad/s) with Nordel 2722 hydrocarbon rubber (C.S. B), which is known to those skilled in the art to be used in wire and cable applications.

What is claimed is:

1. A composition comprising the reaction product formed by heating an admixture containing (1) at least one elastomer comprising ethylene and at least one comonomer which is selected from alpha olefins having at least 3 carbon atoms, dienes and combinations thereof and (2) a coupling amount at least one poly(sulfonyl azide) to at least the decomposition temperature of the poly(sulfonyl azide) for a period sufficient for decomposition of at least about 80 weight percent of the poly(sulfonyl azide) said reaction product having less than about 2 weight percent gel.

2. The composition of claims 1 wherein coupling is indicated by a viscosity change at a shear frequency of 0.1 rad/sec of greater than 5 percent as measured by DMS.

3. The composition of claim 1 wherein at least one elastomer is a ethylene copolymer having at least one alpha olefin comonomer having at least 3 carbon atoms and at least one diene comonomer.

4. The composition of claim 1 wherein at least one elastomer has a molecular weight distribution less than about 3.

5. An article which comprises a composition of claim 1.

6. The article of claim 5 wherein the article is formed from a melt.

7. The process of formation of the article of claim 5 by molding, foaming, or profile extruding.

8. The article of claim 5 which is a coating for wire or cable, a tube, a gasket, a seal, roofing, a foam or a fiber.

9. The article of claim 5 which has been calendared.

* * * * *